Patented Apr. 2, 1935

1,996,486

UNITED STATES PATENT OFFICE 1,996,486

METHOD OF MAKING PLASTIC SUBSTANCES AND PRODUCT OBTAINED THEREBY

Joseph C. Patrick, Kansas City, Mo., assignor of one-half to Nathan M. Mnookin, Kansas City, Mo.

No Drawing. Application April 25, 1927, Serial No. 186,588

13 Claims. (Cl. 106—22)

The invention relates to a plastic composition prepared by the employment of the method and articles set forth in my copending application, Serial No. 166,819, filed February 8, 1927, and relates more particularly to certain further developments and improvements of such substances and method.

In the copending application, there has been described a method of producing a factitious plastic substance by the treatment of an olefin hydrocarbon radical with an alkaline polysulfide. The hydrocarbon radical is preferably present in the form of its additive compounds, such as the halogen derivatives. One product obtained by such methods is of a very pale color, of considerable tensile strength, good adhesion and cohesion values, high elasticity, capable of several physical conditions as to pliability within wide ranges of temperatures, impermeable to water and gases and not affected by many solvents, of high dielectric value and having a specific gravity higher than that of water. It is not injured by boiling with dilute acids, alkalies, or oxidizing agents. In general, the material resembles rubber in physical and chemical properties but differs therefrom in its chemical constituency and and stability.

It has now been found that a substance having additional desirable properties can be produced by the incorporation of a metal soap, preferably but not essentially an insoluble metal soap, in intimate mixture with the substance set forth in my copending application. This incorporation may be accomplished by the addition of a material containing the radical of a fatty acid to the product according to the corresponding appplication, either before or after the sulfurizing reaction: with the addition to such mixture of a metallic base, so that the acid and the base unite to form a soap within the material. In this way the finished plastic substance has an increased toughness and hardness, and constitutes a superior product for use as a floor or roof covering, impregnant for fabric, as a base material for tires, tubes, surgical articles usually made of rubber, and the like. There is an appreciably less odor, the product is more receptive to the incorporation of color pigments, is more easily molded, and there is a very considerable increase in tensile strength.

The ability of certain solvents such as carbon disulfide to disperse the new plastic substance can be available to maintain the dough in a less viscous condition, but such solvent is permitted to evaporate at the final stages of the product to form the finished article.

As examples of the production of such materials may be given the following:

Example I

The permanently gaseous product obtained from the intensive cracking of petroleum, and consisting largely of ethylene, propylene, and butylene, with traces of amylene and other similar hydrocarbons is chlorinated at the ordinary temperature by a usual method, whereby is formed an oily halogen additive compound containing the hydrocarbon radicals, and having a boiling point of above 80° C. A slurry of hydrated lime is treated with sulfur at a boiling temperature until saturation occurs: and the solution is then diluted with water to adjust the specific gravity to substantially that of the halide oil. 100 gallons of this calcium polysulfide solution is mixed with approximately 50 gallons of the mixed oily halide: a reaction occurs at ordinary temperatures, but it is preferred to accelerate this reaction by heating in a reflux apparatus having an agitator to a temperature slightly above the boiling point of the mixed halides. A resulting product of at least 25 lbs. of plastic material is obtained, which is boiled with water to drive off occluded volatile substances and compounds.

Twenty pounds of this finished plastic, calculated on a dry basis, is placed in carbon disulfide and masticated. At the completion of the mastication or kneading, the mass should be pasty and of about the consistency of a thick molasses. One pound of oleic acid is added and the kneading operation is continued until a thorough incorporation has occurred. Two pounds of litharge are then added and the kneading continued for thorough incorporation: during the course of which kneading a reaction occurs between parts of the litharge and the oleic acid to produce a soap, lead oleate, which is insoluble and produces desirable changes of the plastic material. The solvent is removed by evaporation.

The material may be mixed with filling materials such as asbestos fiber, fragments of cloth, sand, or dust, barium sulfate, fiber, etc., as well as with pigments to produce a desired color, such as the mineral earth pigments, Venetian red, chrome green, ochres, etc.: and the mass may then be pressed into a fabric backing to produce a floor covering. It is desirable to maintain the plastic dispersed in the solvent until the operation of impregnation of the fabric has occurred, since in this way the mass is maintained in a less viscous condition. The solvent is thereafter removed by evaporation, and the floor covering is ready for use. Such a floor covering is resistant to water and heat, and is not attacked by alkaline and acid solutions: the impregnated mass is also an insecticide and vermicide, and protects the material against the attacks of insect, and vegetable parasites.

Example II

A plastic is made up as in Example I, except that the fatty acid is mixed with halide oil before the polysulfide solution is incorporated and the sulfurizing reaction accomplished. The oleic acid therefore is intimately and uniformly distributed throughout the mass of the plastic produced and acts during the reaction as an emulsifier. The liquid is drained from the plastic mass, which is then treated with carbon disulfide by mastication and kneading until a substance having the viscosity of a stiff molasses is produced, and then the litharge is added and thoroughly kneaded to form a uniform material. During the course of this kneading, the saponifying reaction mentioned above occurs, and the final mass may then be used as to impregnate fabric, either with or without the addition of fillers and coloring matter.

While these examples have described the employment of oleic acid as a material containing a fatty acid radical, it has been found that other fatty acids such as stearic and linoleic acids may be employed, as well as the fatty acids obtained from various oils, fats and waxes: and that the material may be added in the form of fatty glycerides. Radicals of one or more of the acids may be employed as desired. The litharge set forth in these examples as a metallic base may be replaced by the oxides of barium, calcium, magnesium, zinc, etc., or the corresponding carbonates or other salts of weak acids which are capable of saponifying the material containing the fatty acid radicals. As set forth in my copending application above referred to, the sulfur is present for the purpose of the reaction in an active form, for which it may either be provided in the form of the polysulfide as set forth in the above examples, or it may be provided as a colloidal solution.

Example III 20 pounds of the initial plastic substance obtained as set forth in Example I are mixed with three pounds of calcium stearate by kneading, whereby is produced a stiff plastic mass which can be employed to impregnate a fabric: or which may be dispersed by carbon disulfide to form a paint or thin coating composition.

Example IV 100 pounds of the thoroughly dried plastic is rolled into sheets, and 2% by weight of oleic acid is uniformly applied to the surface of the sheets. The sheets are then folded back upon themselves and successively passed between metallic roll surfaces heated to a temperature of about 100° C. until the fatty acid has been thoroughly incorporated. Litharge is then sprinkled upon the surface of the sheets and they are again pressed and rolled, with folding, until a homogeneous product has been obtained. Litharge is successively sprinkled over the sheets until as high as 75% by weight of litharge has been incorporated. A weight of powdered mineral equal to the weight of the product thus produced is then incorporated in a similar manner, whereby a heavily filled product is obtained which is easily adapted as a floor covering, being resistant to wear, hard, tough, and capable of coloring by mineral matters as may be desired.

I claim:

1. The method of preparing a water-insoluble plastic which comprises treating olefin dihalides with a polysulfide solution at a boiling temperature, dispersing the resultant product in carbon disulfide, incorporating therewith a material containing the radical of oleic acid, saponifying with a basic lead compound, and removing the carbon disulfide.

2. A plastic containing the reaction product of a halide additive of an olefin with a polysulfide, and a metal soap intimately mixed therewith.

3. The method of producing a plastic which comprises incorporating a fatty acid soap with the reaction products resulting from the interaction of polysulfides and compounds of olefins of the formula $C_nH_{2n}$.

4. The method of producing a plastic which comprises incorporating a fatty acid compound with the reaction products resulting from the interaction of polysulfides and compounds of olefins of the formula $C_nH_{2n}$ and saponifying the fatty acid compound.

5. The method of producing a plastic which comprises incorporating a fatty acid compound with the reaction products resulting from the interaction of polysulfides and compounds of olefins of the formula $C_nH_{2n}$ and saponifying the product to produce a metallic soap therein.

6. The method of producing a plastic which comprises dispersing the reaction products resulting from this interaction of polysulfides and compounds of olefins of the formula $C_nH_{2n}$ in a volatile organic liquid, mixing a fatty acid compound therewith, saponifying the fatty acid compound, and removing the solvent.

7. The method of producing a plastic which comprising dispersing the reaction products resulting from the interaction of polysulfides and compounds of olefins of the formula $C_nH_{2n}$ in a volatile organic liquid, admixing therewith a fatty acid compound and saponifying the fatty acid to produce a metallic soap.

8. The method of producing a plastic which comprises dispersing the reaction products resulting from the interaction of polysulfides and compounds of olefins of the formula $C_nH_{2n}$ in carbon disulfide, mixing a fatty acid compound therewith, and saponifying the fatty acid compound.

9. The method of producing a plastic which comprises dispersing the reaction products resulting from the interaction of polysulfides and compounds of olefins of the formula $C_nH_{2n}$ in carbon disulfide, forming a metallic soap of a fatty acid in the resulting mixture and removing the carbon disulfide.

10. A plastic comprising the reaction products resulting from the interaction of polysulfides and compounds of olefins of the formula $C_nH_{2n}$ and a metallic soap.

11. A plastic comprising the reaction products resulting from the interaction of polysulfides and compounds of olefins of the formula $C_nH_{2n}$ and a metallic soap.

12. A plastic comprising the reaction products resulting from the interaction of polysulfides and compounds of olefins of the formula $C_nH_{2n}$, a metallic soap and a volatile organic liquid as a dispersing agent.

13. A plastic comprising the reaction products resulting from the interaction of polysulfides and compounds of olefins of the formula $C_nH_{2n}$ in dispersion in a volatile organic liquid.

JOSEPH C. PATRICK.